Patented June 15, 1937

2,084,011

UNITED STATES PATENT OFFICE 2,084,011

RESINOUS MERCAPTAZOLE DERIVATIVES

Jan Teppema, Boston, Mass., assignor to Wingfoot Corporation, Wilmington, Del., a corporation of Delaware No Drawing. Application May 23, 1935, Serial No. 23,028

12 Claims. (Cl. 260—44)

This invention relates to a class of novel compositions the members of which, either alone or in conjunction with other substances, are useful as accelerators of the vulcanization of rubber. It relates, among other things, to a method of accelerating the processes of vulcanization by incorporating in the unvulcanized stock certain novel compositions of the kind herein disclosed which not only are comparatively easy to prepare but also serve to impart desirable physical properties to the vulcanized product. The class of compositions in question are the formaldehyde derivatives of reaction products of mercaptazoles, such as mercaptothiazoles and mercaptoxazoles with formaldehyde and an ammonium sulphide such as ammonium hydrogen sulphide ($NH_4HS$), ammonium sulphide [$(NH_4)_2S$] and ammonium thio cyanate ($NH_4CNS$).

In the preparation of these new compositions the reaction product of the mercaptazole, formaldehyde and the ammonium sulphide is first prepared. In its preparation a number of variations of procedure are possible. Thus, formaldehyde and the desired ammonium sulphide may be first reacted and this reaction product reacted with the mercaptazole. Also, the ammonium sulphide may be reacted with the mercaptan and this reaction product reacted with formaldehyde. Another procedure is to first react the mercaptan and formaldehyde and then treat this reaction product with the ammonium sulphide desired. A still further procedure is to react all three reactants at once.

If a reaction product of formaldehyde and the ammonium sulphide is to be prepared first, it is obtained by simply reacting the two materials. Since the reaction is exothermic, it is generally preferable to react the materials in the cold. One method which has been found particularly suitable is that in which 1000 parts by weight of an approximately 40% solution of ammonium hydrogen sulphide, cooled with approximately 600 parts of ice, are mixed with 1620 parts by weight of an aqueous 37% formaldehyde solution. An exothermic reaction takes place with the separation of a white gummy mass which gradually resinifies. This material, after being permitted to stand for some time, is ground to a fine powder, washed with water and dried. The reaction product may then be reacted with a mercaptazole as will be described hereinafter. It is to be understood that it is not necessary to first grind the reaction product, wash it and dry it before its further reaction with the mercaptazole.

In the above example, the formaldehyde and ammonium hydrogen sulphide are reacted in the proportion of five mols of aldehyde to two mols of the sulphide. Although its exact constitution is not known, this particular product has been referred to in the 4th Edition of Beilstein, Volume I, page 563, as "penta methylene diamino disulphide". The following equation has been suggested for its formation:

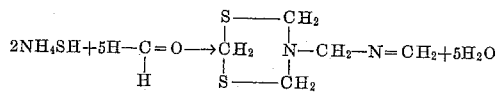

It will be understood that despite the fact that a name and formula have been assigned this reaction product, there is doubt as to its constitution.

While the reaction products of "penta methylene diamino disulphide" and mercaptazoles have been found very effective in the invention, it is to be understood that formaldehyde and ammonium hydrogen sulphide may be reacted in substantially any other proportions. Likewise other ammonium sulphides such as ammonium sulphide ($(NH_4)_2S$), and ammonium thio cyanate ($NH_4CNS$), may be employed in place of, or in admixture with, the ammonium hydrogen sulphide.

Example 1

Illustrative of the invention, 32 parts by weight of 1-mercaptobenzothiazole, 32 parts of the "penta methylene diamino disulphide" described above and 150 grams of toluol are heated under reflux. At first a clear solution is obtained, but as the reaction proceeds the reaction product becomes insoluble. After heating under reflux for a period of four hours, the insoluble material is filtered off and extracted with 3% aqueous ammonia at a temperature in the neighborhood of the boiling point in order to remove any unreacted 1-mercaptobenzothiazole. It will be found that the reaction proceeds almost to completion as two successive extractions yield after acidification only 1.5 parts of unreacted 1-mercaptobenzothiazole. The reaction product is a grayish white material which melts in the neighborhood of 193–195 degrees C. While the exact formula of this reaction product is not known, it has been suggested that the following equation represents the reaction:

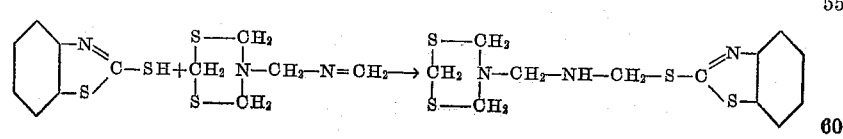

150 grams of this reaction product of 1-mercaptobenzothiazole and penta methylene diamino disulphide are then mixed with 150 grams of a 37% aqueous solution of formaldehyde and heated at a temperature in the neighborhood of 200° C. for a period of 8 hours. The mass is then permitted to cool, is ground and washed thoroughly with water. Upon being permitted to dry in the air, approximately 150 grams of a resinous product which softens at a temperature of from 60 to 80° C. is obtained. This material is a good long range accelerator of vulcanization and is very easy to incorporate in the rubber.

Formaldehyde derivatives of other reaction products of mercaptazoles, formaldehyde and ammonium sulphides are prepared similarly and are good accelerators of vulcanization. Generally the formaldehyde derivatives are resinous materials. The proportion of formaldehyde and mercaptazole reaction product which are reacted may vary within wide limits, it being desirable that sufficient formaldehyde be present to make the formaldehyde derivative resinous in nature. Generally equal parts by weight will be found satisfactory, but the proportion by weight of formaldehyde may be as low as one half and as high as five times that of the mercaptazole reaction product. Generally, it will be necessary to heat the formaldehyde and mercaptazole reaction product for a period of time which will be found to vary somewhat with the temperature employed and the proportions of reacting materials. The temperature range varies from room temperature to 250° C. and the times correspondingly up to 10 hours.

Other mercaptazole reaction products which may be used in preparing the formaldehyde derivatives of the invention are illustrated in the following Examples 2 to 9, inclusive.

*Example 2*

The reaction product of mercaptobenzothiazole, formaldehyde and NH₄HS described in Example 1 may be prepared simply by fusing the "penta methylene diamino disulphide" and the 1-mercaptobenzothiazole, thus eliminating solvents entirely. In such case 147 grams of the "penta methylene diamino disulphide" are heated to 120 degrees C. Gradually 152 grams of 1-mercaptobenzothiazole are added thereto. The mass becomes stiffer with the addition of the mercaptobenzothiazole and the temperature is correspondingly raised to 170 degrees C. and finally to 195 degrees C. The reaction is most violent at approximately 180 degrees C. The product is extracted three times with 3% boiling ammonia whereupon 260 parts of reaction product remain.

*Example 3*

Further illustrative of the mercaptazole reaction products used in preparing the formaldehyde derivatives of the invention, 83.5 parts of 1-mercaptobenzothiazole are added to 116 parts of an aqueous solution of approximately 44% ammonium hydrogen sulphide. 244 parts of a 37% aqueous formaldehyde solution are added slowly, meanwhile agitating the mass vigorously and keeping the temperature at approximately 25 degrees C. The mass is then allowed to stand for 16 hours after which it is heated in boiling water. At approximately 80 degrees C. the product is gummy, but on raising the temperature to boiling a white hard product is formed. The product after being extracted with boiling ammonia, melts in the neighborhood of 188-190 degrees C. and is obtained in a yield of 95 parts.

*Example 4*

In another variation of the procedure of reacting a mercaptazole, formaldehyde and an ammonium sulphide, 132 parts of a 38.8% aqueous ammonium hydrogen sulphide solution, 50 parts of 25% aqueous ammonia, 83.5 parts of 1-mercaptobenzothiazole and 200 parts of ice are admixed. To this mixture is added slowly, with stirring, 250 parts of a 37% aqueous formaldehyde solution. After all the formaldehyde is added, the temperature is raised to the boiling point. A white reaction product is obtained, after which grinding and washing with 3% boiling ammonia, is obtained in a yield of 114 parts, melting in the neighborhood of 181-184 degrees C.

*Example 5*

334 parts of 1-mercaptobenzothiazole are dissolved in a solution of 90 parts of caustic soda in 1000 parts of water and to this solution are added 170 parts of 37% aqueous formaldehyde solution. The mass is allowed to stand for one hour at 25-30 degrees C. after which the solution is filtered and acidified with a 10% aqueous sulphuric acid solution. A precipitate, consisting essentially of benzothiazyl, 1-thiomethylene hydrin,

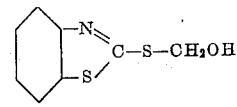

forms, and is filtered and washed with water. To the wet cake of the benzothiabyl 1-thiomethylene hydrin are added 522 parts of a 39.5% aqueous ammonium hydrogen sulphide solution, 1200 parts of ice and 660 parts of 37% aqueous formaldehyde solution. The mass is allowed to stand for 12 hours, meanwhile being agitated and is then boiled for a period of approximately one hour. A white reaction product, which after being cooled, ground and washed with 2000 parts of a 3% NaOH solution at 25 degrees C., is obtained in a yield of 560 parts and melts in the neighborhood of 195-198 degrees C. 32 parts of unreacted 1-mercaptobenzothiazole are recovered after washed with the NaOH solution.

It will be understood that the benzothiazyl 1-thiomethylene hydrin may be prepared by other methods, such as, for example, by suspending 1-mercaptobenzothiazole in alcohol and adding formaldehyde. The benzothiazyl 1-thiomethylene hydrin is very soluble in alcohol and can be obtained in a pure form by crystallization.

It will be noted that the products obtained in Examples 1 to 5, inclusive, have slightly different melting points although the reacting materials are the same. These differences are caused by small amounts of impurities which vary according to the method of preparation employed. By dissolving any of the products of Examples 1 to 5 in nitrobenzene and in symmetrical glyceryl dichlor-hydrin and crystallizing them, they can be obtained in a substantially pure state melting at 223-224 degrees C.

*Example 6*

Illustrative of a reaction product employing ammonium sulphide (NH₄)₂S, 168 parts of 1-mercaptobenzothiazole are added to 256 parts of a 36% aqueous solution of ammonium sulphide and 400 parts of ice. To this mixture 492 parts of a 37% aqueous formaldehyde solution are added slowly with agitation. The mixture is allowed to stand for approximately one hour at a temperature not above 25 degrees C. after which the mass is heated to 100 degrees C. A cream colored reaction product formed which, after being freed from unreacted 1-mercaptobenzothiazole by extraction with a 2% aqueous sodium hydroxide solution at 80 degrees C. is obtained in a yield of 243 grams. The reaction product melts at 120–122 degrees C.

*Example 7*

The reaction product of 4-chlor 1-mercaptobenzothiazole, formaldehyde and ammonium hydrogen sulphide may conveniently be prepared by adding 64 parts by weight of 4-chlor 1-mercaptobenzothiazole to 200 parts of ice, 19 parts of 28% aqueous ammonia and 64 parts of 39.5% aqueous $NH_4SH$ solution. The mixture is agitated and 123 parts of 37% aqueous formaldehyde solution are added slowly thereto. The mass is heated to the boiling point for approximately 15 minutes whereupon a white reaction product forms. This reaction product, after being extracted with 500 parts of 3% caustic soda solution at 25 degrees C. and dried, is obtained in the form of a white powder melting at 211–213 degrees C.

*Example 8*

The reaction product of penta methylene diamino disulphide and a mixture of 3-methyl 1-mercaptobenzothiazole and 5-methyl mercaptobenzothiazole is prepared by suspending in 250 cc. of benzene 36.2 grams of a mixture of 3-methyl 1-mercaptobenzothiazole and 5-methyl 1-mercaptobenzothiazole, adding thereto 32.4 grams of penta methylene diamino disulphide and refluxing the mixture for a period of five hours. The resulting solution is then concentrated to one half its volume, cooled, filtered and air dried whereupon 55 grams of a practically colorless solid melting at 85–90° C., which is the reaction product of penta methylene diamino disulphide and 3- and 5-methyl 1-mercaptobenzothiazole, are obtained.

*Example 9*

A mixture of 84 grams of 1-mercaptobenzothiazole, 300 grams of water, 38 grams of ammonium thiocyanate and 80 grams of a 37% aqueous solution of formaldehyde is heated to boiling for 30 minutes. An oil forms during the boiling period and solidifies on cooling to a resinous mass. This mass is then extracted with a dilute aqueous solution of sodium hydroxide whereupon a yield of 109 grams of a light colored transparent resin melting at 123–125° C. is obtained.

While the mercaptazole reaction products described in detail herein have used various 1-mercaptobenzothiazoles in their preparation, it will be understood that the invention is not limited thereto but extends to the use of any other mercaptazole, examples being 5-chlor 1-mercaptobenzothiazole, 4-nitro 1-mercaptobenzothiazole, 5-nitro 1-mercaptobenzothiazole, 4-chlor 5-nitro 1-mercaptobenzothiazole, 3-phenyl 1-mercaptobenzothiazole, 3-propoxy 1-mercaptobenzothiazole, 5-ethoxy 1-mercaptobenzothiazole, 5-methoxy 1-mercaptobenzothiazole, 1-mercapto benzoxazole, 1-mercapto tolyl thiazoles, 1-mercapto benzimidazole, dimethyl 1-mercaptobenzothiazoles, 3-phenyl 5-mercapto 1-2-4-thiodiazole, 1-mercapto naphthothiazoles, 3-p-tolyl 5-mercapto 1-2-4-thiodiazole and 5-mercapto 1-3-4-thiodiazoles. Any of these mercaptazoles may be reacted with formaldehyde and an ammonium sulphide according to the different variations of procedure described in the preceding examples and the reaction product further reacted with formaldehyde to form the formaldehyde derivatives of the invention.

The derivatives to which the invention relates may be employed as accelerators of vulcanization in substantially any of the ordinary rubber formulae, one found particularly satisfactory being the following:

| | Parts by weight |
|---|---|
| Extracted pale crepe rubber | 100 |
| Zinc oxide | 5 |
| Sulphur | 3 |
| Stearic acid | 1.5 |
| Accelerator | 0.5 |

After vulcanization, physical tests conducted on stocks so made up will give results of the order of the following:

| Cure in mins. at ° F. | Ult. tens. kgs/cm.² | Max. elong. in percent | Modulus in kgs/cm² | |
|---|---|---|---|---|
| | | | 500% | 700% |

Formaldehyde deviative of penta methylene diamino disulphide—mercaptobenzothiazole reaction product.

| 20/260 | 15 | 880 | 5 | 8 |
| 40 | 91 | 860 | 13 | 36 |
| 60 | 113 | 810 | 19 | 60 |
| 80 | 116 | 760 | 23 | 81 |

It is thus apparent that the formaldehyde derivatives of the invention possess valuable properties as accelerators of vulcanization. In particular, they are very easily and uniformly incorporated in rubber. Furthermore, they may be employed as accelerators either by themselves or in conjunction with other basic nitrogen-containing accelerators, such as diphenylguanidine, diphenylguanidine acid phthalate, diortho tolyl guanidine, dibutyl ethylene diamine, butyl ammonium oleate, diphenylguanidine oxalate, 2-4-diamino diphenyl amine, 4-4' diamino diphenyl methane and the like.

It is intended that the patent shall cover, by suitable expression in the appended claims, whatever features of patentable novelty reside in the invention.

My copending application Serial No. 734,232, filed July 7, 1934, now Patent 2,050,203, issued August 4, 1936, contains subject-matter related to that of this application.

What I claim is:

1. As a new composition of matter, the resinous product obtainable by resinifying with formaldehyde the reaction product of a 1-mercapto aryl thiazole, formaldehyde and an ammonium sulphide.

2. As a new composition of matter, the resinous product obtainable by heating to a temperature in the neighborhood of 200° C. for a period of about 8 hours approximately equal parts by weight of a 37% aqueous solution of formaldehyde and the reaction product of a 1-mercaptobenzothiazole, formaldehyde and ammonium hydrogen sulphide, the materials of said latter reaction product having been reacted in the proportion of 1 mol. of thiazole, 5 mols of aldehyde and 2 mols of ammonium sulphide and under conditions involving the elimination of water.

3. As a new composition of matter, the resinous product obtainable by resinifying with formaldehyde the reaction product of a 1-mercaptazole, formaldehyde and an ammonium sulphide.

4. As a new composition of matter, the resinous product obtainable by resinifying with formaldehyde the reaction product of a 1-mercaptobenzothiazole, formaldehyde and ammonium sulphide.

5. As a new composition of matter, the resinous product obtainable by resinifying with formaldehyde the reaction product of approximately equimolar proportions of 1-mercaptobenzothiazole and penta methylene diamino disulphide.

6. As a new composition of matter, the resinous products obtainable by resinifying with formaldehyde the reaction product of approximately equimolar proportions of a 1-mercaptobenzothiazole and penta methylene diamino disulphide.

7. As new compositions of matter, the resinous product obtainable by resinifying with formaldehyde a reaction product of a 1-mercapto arylene thiazole of the benzene and naphthalene series, formaldehyde and ammonium sulphide.

8. As new compositions of matter, the resinous products obtainable by resinifying with formaldehyde a reaction product of a 1-mercapto arylene thiazole of the benzene and naphthalene series, formaldehyde and ammonium thio cyanate.

9. As a new composition of matter, a resinous product of the character described obtainable by resinifying with formaldehyde the reaction product obtainable by reacting under conditions involving the elimination of water one mol. of 1-mercaptobenzothiazole, five mols of formaldehyde and two mols of ammonium hydrogen sulphide.

10. As a new composition of matter, a resinous product of the character described obtainable by resinifying with from approximately one half to approximately five times as much by weight of a 37% aqueous solution of formaldehyde the reaction product obtainable by reacting under conditions involving the elimination of water one mol. of a 1-mercaptobenzothiazole, five mols of formaldehyde and two mols of ammonium hydrogen sulphide.

11. As a new composition of matter, a resinous product of the character described obtainable by resinifying with from approximately one half to approximately five times as much by weight of a 37% aqueous solution of formaldehyde the reaction product obtainable by reacting under conditions involving the elimination of water one mol. of a 1-mercaptazole, five mols of formaldehyde and two mols of ammonium hydrogen sulphide.

12. As a composition of matter, a resinous product of the character described obtainable by resinifying with formaldehyde the reaction product of a 1-mercaptobenzothiazole, formaldehyde and an ammonium sulphide selected from the group consisting of ammonium hydrogen sulphide, ammonium sulphide and ammonium thiocyanate.

JAN TEPPEMA.